Figure 1:
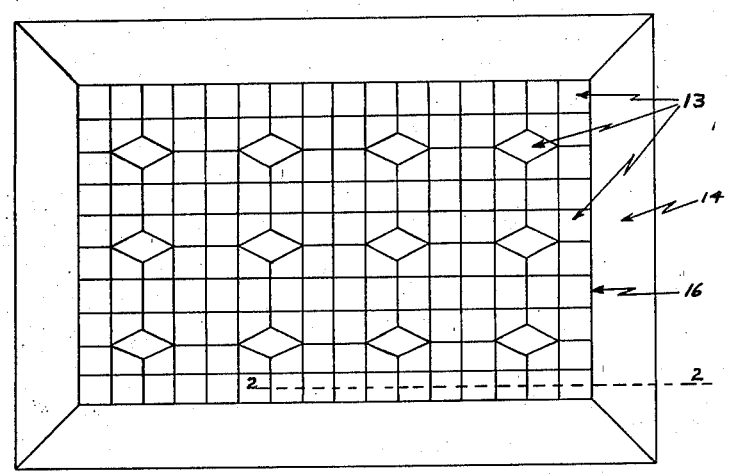

Oct. 5, 1937.  W. A. SALE ET AL  2,094,674

LINOLEUM COMPOSITION FLOORING MATERIAL

Filed Oct. 2, 1934

INVENTORS-
WILLIAM A. SALE
WALTER J. KOENIG
BY
ATTORNEY

Patented Oct. 5, 1937

2,094,674

UNITED STATES PATENT OFFICE 2,094,674

LINOLEUM COMPOSITION FLOORING MATERIAL

William A. Sale, Pelham Manor, N. Y., and Walter J. Koenig, Philadelphia, Pa., assignors to Sloane-Blabon Corporation, Trenton, N. J., a corporation of Delaware Application October 2, 1934, Serial No. 746,484

2 Claims. (Cl. 154—49)

Our invention relates to a decorative flooring material and method of manufacture, and particularly to a compressed material of plastic units used in conjunction with a specially prepared base sheet to form a product not heretofore obtained.

In the manufacture of such flooring material, prior to our invention, many disadvantages presented themselves which made the products impracticable. For example, the saturant, which will be discussed more fully hereafter, oftimes tended to penetrate into the plastic units and thereby caused discoloration. Furthermore, the composition units secured to the backing sheet tended to loosen along the edges of the sheet material, as will be hereinafter described. Also, it was necessary to cement previous linoleum composition products to the supporting floor in order to make a satisfactory and permanent flooring surface. Furthermore, the products, prior to our invention, did not present a complete floor covering by itself in view of the absence of the proper finishing which is essential to create a satisfactory impression to all discriminating eyes. Our invention, as will be set forth below, has entirely removed the disadvantages enumerated, and as far as we are aware, has not been practiced before in the art.

An object of our invention is to prepare a base material which will not discolor the plastic linoleum units. As pointed out above, in the prior art, the waterproofing substance in the base had a tendency to discolor the brilliant colors of the units placed thereon; however, through the medium of our invention, this difficulty is eliminated.

It is also an object of this invention to prepare linoleum composition rugs from long continuous strips of material which, after being cut to the proper sizes, may be packaged in convenient containers. This method of handling linoleum composition products is novel in the trade, particularly in contrast to the bulky and heavy rolls heretofore used.

A further object of our invention is to prepare linoleum flooring products which can be prepared at the point of manufacture in such sizes which will eliminate the waste which heretofore existed in the laying operation. Previously, linoleum products were sent to the distributors in large and bulky rolls, and the materials were sold in any desired quantity by the square yard. The materials were then cut to the desired size where the material was to be used, and generally odd size pieces remained, and in this manner, large quantities of waste resulted which is eliminated through the medium of our invention.

Another object of our invention is to prepare a linoleum flooring material which will eliminate the buckling of the material due to the expansion and contraction which usually occurs along the seams of abutting sheets. The product of our invention is a unitary sheet, made to fit an area and cause a pleasing effect, just as is done with unitary rugs in the soft surface flooring materials. In this manner, joints between adjacent sheets are eliminated.

A further object of our invention is to prepare a linoleum flooring composition mounted on a waterproofed felt base supporting material, which will not have the disadvantages generally encountered with similar materials prior to our invention. Linoleum composition products mounted on a waterproofed felt base have long been recognized, but due to the cracking open of the joints, particularly along the edges of the sheet, and the discoloration of the composition, the product was not desirable. In view of the elimination of the numerous joints along the edges through the medium of the border, and also the use of the thin seal paint between the waterproofed felt and the linoleum composition units, the disadvantages enumerated have been eliminated.

A further object of our invention is to prepare a linoleum floor covering which must not necessarily be cemented to the floor in order to create a satisfactory surfacing material. Due to the additional reinforcement obtained along the edges through the medium of the border, the curling tendency of the edges of the linoleum sheet will be eliminated. The flooring material will lie perfectly flat without the use of fastening means.

A still further object of our invention is to prepare a satisfactory linoleum product mounted on a felt base which will materially decrease the cost of manufacture.

The use of felted materials as a backing medium for linoleum composition has been previously recognized, but due to numerous difficulties herein discussed, the product was not practical. Through the medium of our improvements, the difficulties have been overcome and the product has been just as successfully produced as the more expensive linoleum products. Actual tests have shown that the wearing qualities and properties of the product obtained from the present invention equal to and at times exceed those of the more expensive linoleums. By more expensive linoleums we mean linoleums mounted on burlap backing.

The linoleum composition units used in preparing the patterned design are stamped from sheets of linoleum composition according to well known practices in the linoleum industry. The linoleum composition sheets are prepared by mixing the raw materials, such as gelled oils, ground cork, wood flour, pigments in the usual Banbury or the Jermyn (ofttimes called German) mixers. After thorough mixing, the composition is sheeted between calendar rolls. If the composition mixture contains only one pigment, it is obvious that the calendered sheets have only one color, ofttimes called a solid colored sheet. If the composition mixture contains several pigments, the calendered sheets would have a jaspé effect. The above sheets regardless of whether a solid colored sheet or a jaspé sheet, are then cut into units of the desired size adapted to fit into the designed pattern.

If a marbleized effect is desired in the composition units, the jaspé sheets received from the calendars are run through calendar rolls at right angles to the first passage. This will tend to spread out the striations found in the composition sheet. The sheets may be passed through the calendar rolls as many times as desired, depending entirely on the degree of marbleization desired. Similarly, as above, when the desired degree of marbleization in the calendered sheets is acquired, the sheets are cut into units which will fit into the desired pattern.

The units made according to the above described processes are known in the industry as being made under the straight line inlaid process.

If a moulded inlaid product is desired, the units are moulded directly on the supporting base material hereinafter described. We have found that moulded inlaid will form a satisfactory product; however, we prefer to use the straight line inlaid product due to the increased density of the linoleum composition in the finished product.

The above described methods of preparing the units are conventional in the linoleum industry, and no claim is laid to the described methods. The units may be prepared in any desired method, and the above are merely set forth as an indication of the numerous methods which may be used.

The felt base material, which is used as the supporting base for the above described linoleum composition units, is prepared by passing the sheeted felt through asphalt or equivalent water proofing materials. If the felt sheet saturation is too high, the asphalt will have a tendency to bleed through the linoleum composition units, thus destroying the desired effect of the finished product. A saturation of approximately 125% will form a satisfactory product, although this saturation may be varied in accord with that which is considered necessary to form a quality product in industrial practice.

After the desired degree of saturation is attained in the sheeted felt material, the sheet is run through a coating machine, and two layers of backing paint are applied to the back side of the saturated felt. The backing paint is usually applied by means of rotating brushes, doctor knives, or equivalent spreading means, and is spread out so that approximately .4 pound of paint covers each square yard of surface. The paint will seal the asphalt within the body of the felt, and will further tend to stiffen the body.

A layer of paint is also applied to the upper surface of the saturated felt, thereby forming a face coat, and it is necessary that this coat be applied with care. The layer of paint must be applied sufficiently thick in order to prevent the waterproofing substance from bleeding through, which would obviously discolor the brilliantly colored composition units placed thereon. Also, the layer of paint must be sufficiently thin so that the fibers of the felt will tend to remain in a loose and slightly protruding condition. This is essential in order to get the desired bond between the linoleum composition units which are fastened thereon.

In order to obtain the effects described in the preceding paragraph, the paint is applied in a comparatively thin coat in contrast to the backing layer of paint. The thin paint coating, ofttimes called a "skin face coat", is spread out by means of the rotating brushes, doctor knives or similar spreading means, so that approximately .07 to .15 pound per square yard will create a satisfactory surface. The very thin coat will coat the felt sufficiently in order to prevent the waterproofing substance, present in the felt, from bleeding through, and also will allow the fibers to remain in a comparatively loose and slightly protruding condition.

It is possible to prepare a satisfactory saturated base material omitting the face and/or back seal coat which is suitable as a supporting material for linoleum composition units. This may be done through the control of various factors which enter into the manufacture of the base material, as, for example, the degree of saturation, type of asphalt used, aging of the saturated felt material, etc. It is recognized that the longer a saturated asphalt sheet is allowed to age, the tendency to discolor or bleed through the composition secured thereto will decrease proportionally. Due to the numerous technical difficulties encountered in omitting the facing and/or backing, it is preferable that facing and backing coats be used; however, as pointed out above, it can be done practically.

We have found that in preparing a felted sheet material, as described above, the sheet will have a considerable degree of flexibility. In fact, the flexibility is so great that when the linoleum composition units are secured thereto, through compressing action, the joints between adjacent units had a tendency to loosen, particularly along the edges of the product. This weakness along the edges of the sheet was attributed to the fact that the composition units were abutted on two or three sides only, while the units toward the center of the sheet were abutted on four sides, thereby strengthening the structure.

In order to eliminate the weakness described, we prepared a border strip composed of linoleum composition and extended it along the four sides of the prearranged pattern of linoleum composition units.

The accompanying drawing will illustrate the preferred embodiment of our invention.

Figure 1 shows a plan view of a run prepared in accord with our invention. The numeral 13 represents the linoleum composition units arranged in accordance with a predetermined pattern. The numeral 14 represents the border surrounding the entire pattern.

Figure 2:

Figure 2 shows an enlarged sectional view along line 2—2 of Figure 1. The numerals 11 and 12 represent the paints applied to the saturated felt sheet 10, as described above. Numeral 13 represents linoleum units arranged in a predetermined pattern, and 14 represents the linoleum composition border surrounding the entire pattern.

Figure 3:
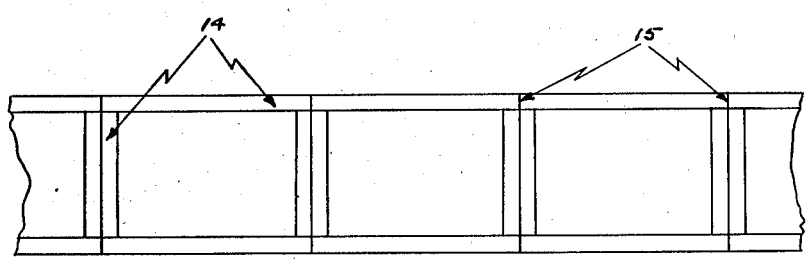

Figure 3 shows a plan view of a series of rugs in the process of manufacture as made on the long strips of prepared felt material. Numeral 15 represents the line where the borders of two rugs abut, and when the long strips of material are thoroughly cured, the strips are separated into individual rugs along the line represented by numeral 15. The numeral 16 represents the joint line between the outside edges of the patterned units 13 and the border 14.

After the sheeted felt material is saturated with waterproofing material and coated on each side with a paint material and thoroughly dried, it is ready to receive the linoleum composition units described above. The prepared felt material is fed over a long table with the thin face coat facing upwardly, and the linoleum composition units are placed on the felt in any desired pattern. When the required number of units have been laid in place, the entire patterned design is surrounded with a border which may harmonize with the colors of the patterned design.

The patterned units and the border are now in a loosely assembled condition on the surface of the felt. The assembled structure is now fed beneath heated presses, and a pressure of approximately 4,000 pounds per square inch on the ram is applied to the assembled structure. The temperature is approximately 200° F.

The pressure and heat applied to the raw linoleum composition units and composition border will cause the joints between adjacent units, and also between the units and the composition border to bind together. The raw linoleum composition products have thermo-plastic properties and will react, as described, when heat and pressure is applied thereto.

Furthermore, the pressure applied to the structure will cause the linoleum composition units and the border to adhere to the fibers of the felt base material. At the same time, the thin coat of paint on the felt base will prevent the asphalt from bleeding through to discolor the composition materials compressed thereon. It is desirable that the paint used have thermo-setting properties since the pressure and heat applied will create such a medium which will enable the paint to increase the bonding properties between the felt base and the linoleum composition pressed thereon. In fact, any thermoplastic paint is satisfactory.

The long strips of compressed material, now consisting of a plurality of connected rugs, are then fed into heaters and cured. When thoroughly cured, the long sheets are cut along predetermined lines, i. e., along the dividing lines between two abutting borders, into individual rugs.

The numerous comparatively small linoleum composition units, which are assembled to form the pattern, are thus reinforced on each side by an abutting linoleum composition material. The difficulty previously encountered along the edges of the sheet material is thus eliminated since the borders surrounding the entire pattern form the necessary reinforcement for the previously exposed edges of the small units.

Although we have described above a particular procedure for producing a flooring material according to our invention, it is to be understood that the invention is in no way limited to such procedure, or to the particular product resulting therefrom, but on the contrary, many changes and variations may be made and numerous other materials may be used without departing from the spirit or the scope of our invention.

What we claim is:

1. An inlaid composition rug comprising a waterproofed flexible felt base, preformed abutting linoleum composition units arranged on the base to form a pattern and adhered thereto, preformed border strips of linoleum composition mounted on said base on all sides, the upper surfaces of which are in the same plane as the pattern units, in contact with and surrounding the edges of the pattern.

2. An inlaid composition rug comprising a waterproofed flexible felt base, the upper and lower surfaces of the base being coated with a fluid sealing means, the sealing means applied to the upper surface being thinner than the sealing means applied to the lower side, preformed abutting linoleum composition units arranged on the base to form a pattern and adhered thereto, preformed border strips of linoleum composition mounted on said base on all sides, the upper surfaces of which are in the same plane as the pattern units, in contact with and surrounding the edges of the pattern.

WILLIAM A. SALE.
WALTER J. KOENIG.